Aug. 22, 1933.  F. S. RIGGS  1,923,747
APPARATUS FOR MOUNTING A RIM UPON A WHEEL
Filed March 13, 1930  2 Sheets-Sheet 1
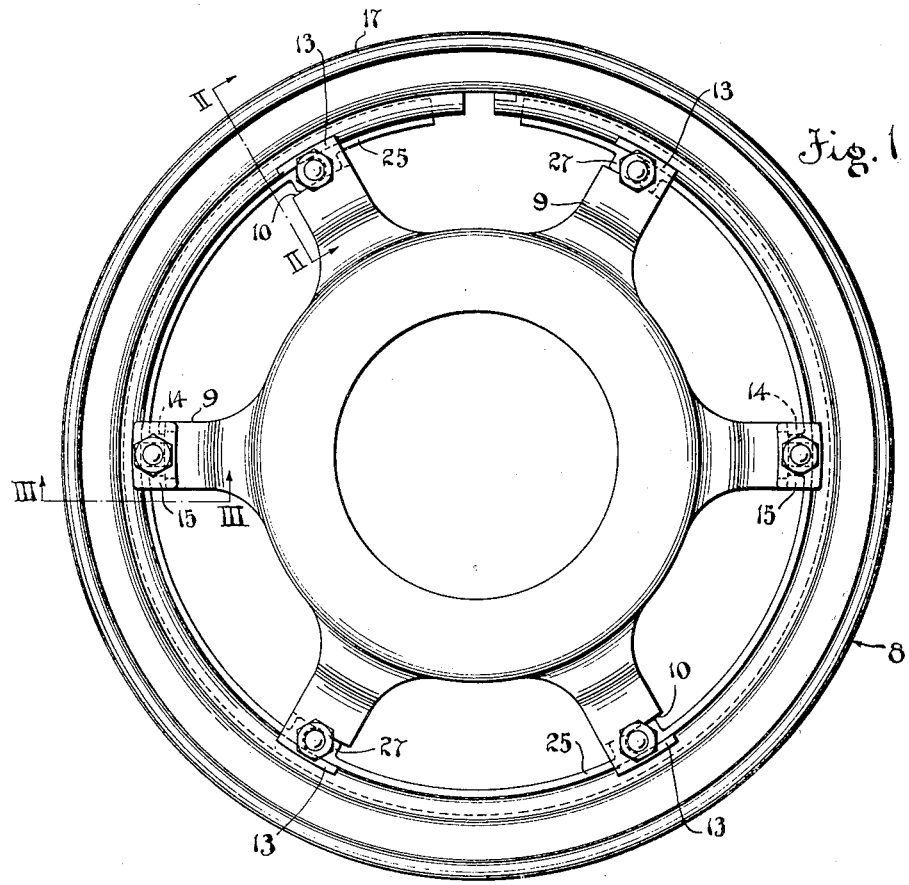
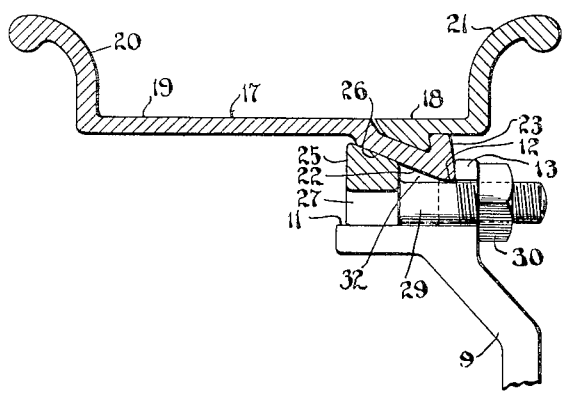
Inventor
Frederick S. Riggs
By
Attorney Aug. 22, 1933.   F. S. RIGGS   1,923,747
APPARATUS FOR MOUNTING A RIM UPON A WHEEL
Filed March 13, 1930   2 Sheets-Sheet 2
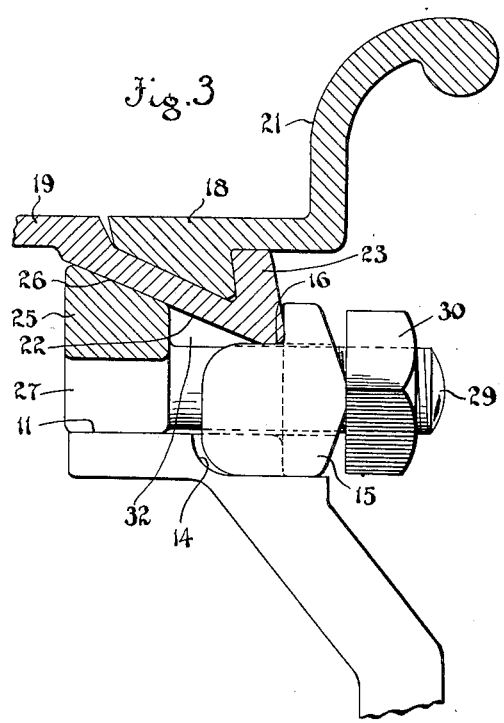
Inventor
Frederick S. Riggs Patented Aug. 22, 1933

1,923,747

UNITED STATES PATENT OFFICE 1,923,747

APPARATUS FOR MOUNTING A RIM UPON A WHEEL

Frederick Stanley Riggs, Akron, Ohio, assignor to The Goodyear Tire & Rubber Company, Akron, Ohio, a Corporation of Ohio Application March 13, 1930. Serial No. 435,483

3 Claims. (Cl. 301—12)

This invention relates to vehicle wheels, and it has particular relation to a method of and apparatus for mounting a rim upon a vehicle wheel.

One object of the invention is to provide a rim mounting in which the rim operates in positive alignment with the wheel.

Another object of the invention is to provide a method of mounting a rim upon a wheel in which the rim can be removed or replaced without the necessity of removing the securing means.

Another object of the invention is to provide a rim mounting in which the necessity of a continuous felloe is obviated.

In mounting rims upon vehicle wheels, it is of prime importance that the rim operate in parallel relation with the wheel. Otherwise, the wear on the tire is uneven and the life of the tire shortened. It is also important that the member be firmly held in alignment and for positive coaction with the rim securing means. Heretofore, the rim has been retained in position by a wedge securing means alone, but in rim mountings employing this type of securing means, even though the rim is initially positioned in positive alignment, it ultimately creeps into un-parallel position relative to the wheel.

By providing a construction in accordance with this invention the rim is initially positioned in an inclined plane over the flange adjacent the top of the wheel, after which the bottom of the rim is moved laterally across the flange until it is in parallel relation with the wheel. The rim is then secured in positive alignment by means of the flange on the outboard side of the wheel and a wedging means positioned on the inboard side thereof. According to one form of the invention, the ends alone of the spokes support the rim instead of a continuous felloe. By employing a continuous felloe, it is always difficult to construct the rim and the felloe equally concentric and, as a result, the rim does not rest upon the felloe at all points. Where the spokes alone are employed, it is much easier to shape the ends of the spokes to the proper and true dimensions. Moreover, by employing spokes alone to support the rim, the portion of the rim between the spokes permit the shape of the rim to be slightly varied, if necessary, to conform the rim to the true curvature of the spoke ends.

For a better understanding of the invention, reference may now be had to the accompanying drawings, forming a part of this specification, in which:

Fig. 1 is an elevational view of a wheel constructed in accordance with the invention;

Fig. 2 is a cross-sectional view of one form of the invention taken substantially along the line II—II of Fig. 1; and Fig. 3 is a fragmentary cross-sectional view on an enlarged scale taken substantially along line III—III of Fig. 1.

In practicing the invention, a wheel 8 is provided with a plurality of spokes 9 some of which have slots 10 therein. Each spoke is provided on its laterally inner or inboard side with a rim supporting surface 11 of substantially less diameter than a rim seat 12 which forms a part of a flange 13, which is provided on certain of the spokes 9. Other of the spokes are provided with recesses 14 adapted to support lugs 15 having rim seats 16 thereon.

A tire rim 17 comprising an endless ring 18, a split ring 19 and a conventional tire engaging means 20 and 21 is provided on its inner periphery with a single inclined seating face 22 and a shoulder 23 adjacent thereto. The minimum diameter of the rim seating face 22 is substantially the same as the diameter of the rim seat 12 whereas the maximum diameter of the flange 13 is greater than the minimum diameter of the face 22. It accordingly follows that the shoulder 23 abuts the flange 13 and the edge portion of the inclined seating face 22 rests upon the rim seat 12.

In order to secure the rim in its proper position one or more wedge members 25 are provided having inclined surfaces 26 which engage the inclined seating face 22 of the rim and lugs 27 which engage the rim supporting surfaces 11 of the spoke. The wedge members 25 are provided with integral bolts 29 which project through the slots 10 or the lugs 16 of the spokes 9. Conventional nuts 30 threaded upon the bolts 29 abut the outboard surface of the spokes 9 adjacent the flange 13. It is apparent that the tightening of the nuts 30 forces the wedge members 25 between the rim seating face 22 and the rim supporting surface 10 thereby securing the rim in positive alignment with the wheel. Spaces or recesses 32 that remain between the wedge members 25 and flanges 13 facilitate the mounting or demounting of the rim upon the wheel.

It is apparent from the above description and drawings that the wedging member 25 is provided with circumferentially spaced projections 27 directed radially toward the center of the wheel and that each of these projections normally is seated on the surface 11 of one of the spokes of the wheel. The slots 10 at the outer ends of four of the spokes permit circumferential movement of the bolts 29 that are integral with the wedging member 25. When the wedging member is moved circumferentially a predetermined distance, the lugs 27 are moved beyond the ends of the spokes and the surfaces 11, and consequently, the wedging member may be moved radially toward the center of the wheel a distance equal to the radial depth of the lugs. Initially, in mounting the rim 17 on a wheel, the nuts 30 on the bolts 29 are loosened considerably and the wedging member 25 is moved toward the inboard side of the wheel sufficiently that the beveled seat 22 on the rim can be disposed on the tapered surface of the wedging member without being disposed radially outwardly of the seat 23 on the wheel. After the wedging member 25 is so turned, as described above, and is moved toward the inboard side of the wheel, the rim is tilted with respect to the axis of the wheel and its upper part is moved laterally over flanges 13 until the beveled seat on the rim engages the beveled surface of the wedging member 25. It is apparent that depressing the wedging member toward the center of the wheel will permit a similar movement of the beveled seat on the rim a distance equal to the radial depth of the lugs 27. In other words, when the wedging member is turned until the portion 29 is free of the recesses 10 and the projections 27 are free of the surfaces 11, the wedging member and bolts may be moved laterally toward the center of the wheel a distance equal to the radial depth of the lugs 27, and since the wedging ring has been moved laterally toward the inboard side of the wheel by loosening nuts 30, the beveled seat on the rim can be moved radially inwardly past the inboard side of the seat 23 on the wheel until it rests on the beveled seat of the wedging ring in its depressed position. Operating the rim in this manner at the upper side of the wheel, as shown by Fig. 1, causes the lower side of the rim to be so positioned that it can be moved laterally toward the inboard side of the wheel over the flanges 13 on the bottom spokes. When the lower side of the rim has been moved beyond the flanges 13 on the lower spokes, the upper part of the rim can be moved radially outwardly and then toward the outer side of the wheel laterally over the seat 23 on the wheel. Then the wedging member 25 can be turned until the lugs 27 again engage the seats 11 and the bolts 29 are again disposed in the slots 10.

The seat 23 on the wheel serves as a means for insuring concentricity of the rim with respect to the wheel, as is clearly shown by Fig. 2. If the wedging ring at one side of the wheel should be tightened more than at another side, the rim at the side tightened most cannot move radially outwardly but a limited distance because it will engage the seat 23 at the diametrically opposite side of the wheel. Hence it is apparent that the construction provided serves as a means for aligning the rim with respect to the plane of the wheel, and also serves to maintain the rim concentric with respect to the axis of the wheel.

Manipulation of the rim is similar to that required in mounting, and mounting tires from the so-called "drop center" rim, i. e., one side of the rim is dropped into a recess formed by depressing the wedging ring radially inwardly and moving it toward the inboard side of the wheel, and thereafter the diametrically opposite side of the rim is moved toward the inboard side of the wheel until it is aligned with the upper side of the rim. Then the rim can be centralized with respect to the axis of the wheel by moving it over the seats 23. It is apparent that the clamping lugs 15 on two of the spokes do not interfere with mounting the rim because they are not placed in their operative positions until after the rim is mounted.

From the foregoing description, it will be apparent that a method and apparatus for mounting a rim upon a wheel is provided in which the wheel can be mounted or demounted without removing the securing means from the wheel, and that will also maintain the rim in positive alignment with the wheel.

Although only the preferred form of the invention has been shown and described in detail, it will be apparent to those skilled in the art that the invention is not so limited but that various modifications may be made therein without departing from the spirit of the invention or from the scope of the appended claims.

What I claim is:

1. A wheel assembly comprising a wheel member having a substantially radial flange on the outboard side portions of its periphery, and a rim-supporting surface laterally inwardly of the flange, portions of the periphery being free of said flange, a rim having an axially inclined seat and a substantially radial wall adjacent said seat, the inclined seat normally being disposed radially outwardly of the rim supporting surface on the wheel periphery and said wall abutting the inboard side of the flange, and rim wedging means between the inclined seat on the rim and the wheel member, said wedging means being movable radially inwardly of the wheel whereby the rim can be moved correspondingly, said movement of the wedging ring and rim being such that when one part of the rim is moved radially inward, the diametrically opposite side of the rim is moved sufficiently radially that it can be moved axially toward the outboard side of the wheel over the flange.

2. A wheel assembly comprising a wheel member having substantially radially directed flange portions on the outboard side of its outer periphery over circumferential spaced portions of the latter, and rim-supporting portions on the inboard side of the flanged portions, a rim having a beveled seat and a substantially radial wall adjacent the seat, said beveled seat being disposed over the rim-supporting portions at the inboard side of the flanged portions and the wall on the rim abutting the inboard side of the flanged portions, the least radius of the rim being smaller than the distance from the wheel axis to the periphery of the flanged portions but larger than the radius of the wheel member between the flanged portions, laterally movable wedging means between the rim seat and the wheel member, and removable clamps for engaging the radial wall of the rim in the spacings between the portions of the wheel member provided with the flanged portions.

3. A wheel assembly comprising a wheel member having outwardly directed, circumferentially spaced, radial flanges at its outboard side and on its outer periphery, that portion of the wheel periphery circumferentially between the flanges being of smaller radius than the latter, said wheel being provided with a rim-supporting surface on its outer periphery at the inboard side of the radial flanges, which is of smaller radius than the distance from the wheel axis to the periphery of the flanges, a rim having a single beveled seat on its inner periphery, the least radius of said rim being smaller than the distance from the wheel axis to the periphery of the flanges but of such radius that one side of the rim may be moved radially inwardly beyond the seat sufficiently that the diametrically opposite side of the rim may be moved laterally toward the outboard side of the wheel member and over the flanges, and wedging means between the beveled seat on the rim and the wheel member for securing the rim normally in such position that it engages the flanges.

FREDERICK S. RIGGS.